S. DOMINGUEZ.
AUTOMOBILE WHEEL.
APPLICATION FILED JUNE 14, 1917. RENEWED MAY 2, 1921.
1,383,085.
Patented June 28, 1921.
2 SHEETS—SHEET 2.
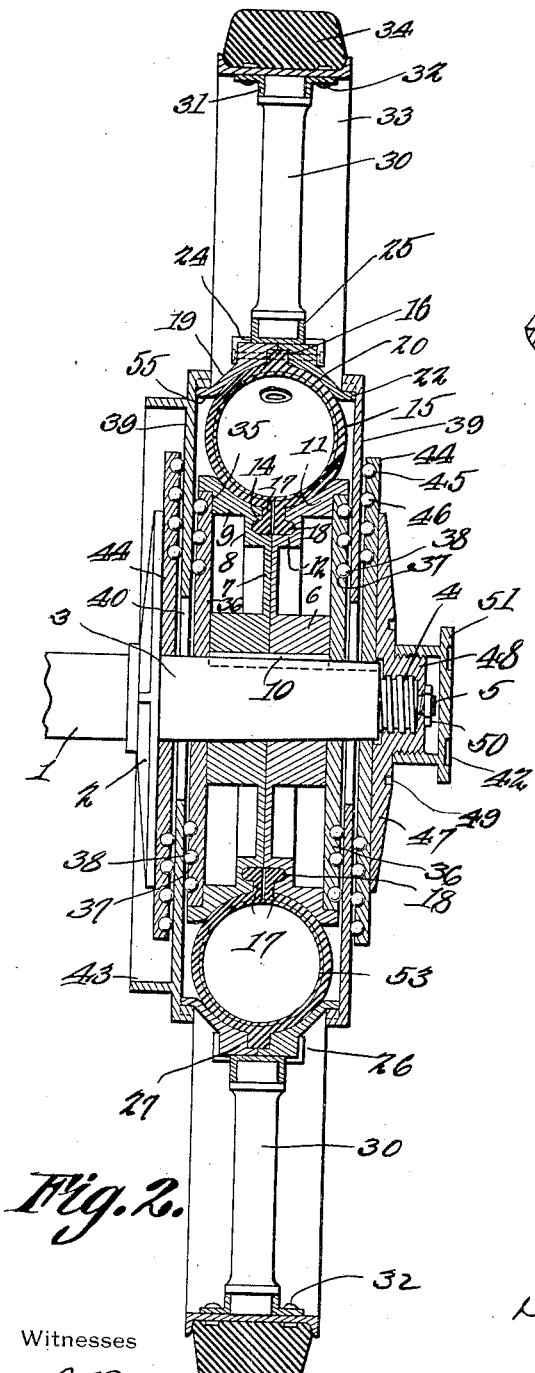
Witnesses
S. Dominguez
Inventor,
by 
Attorneys.

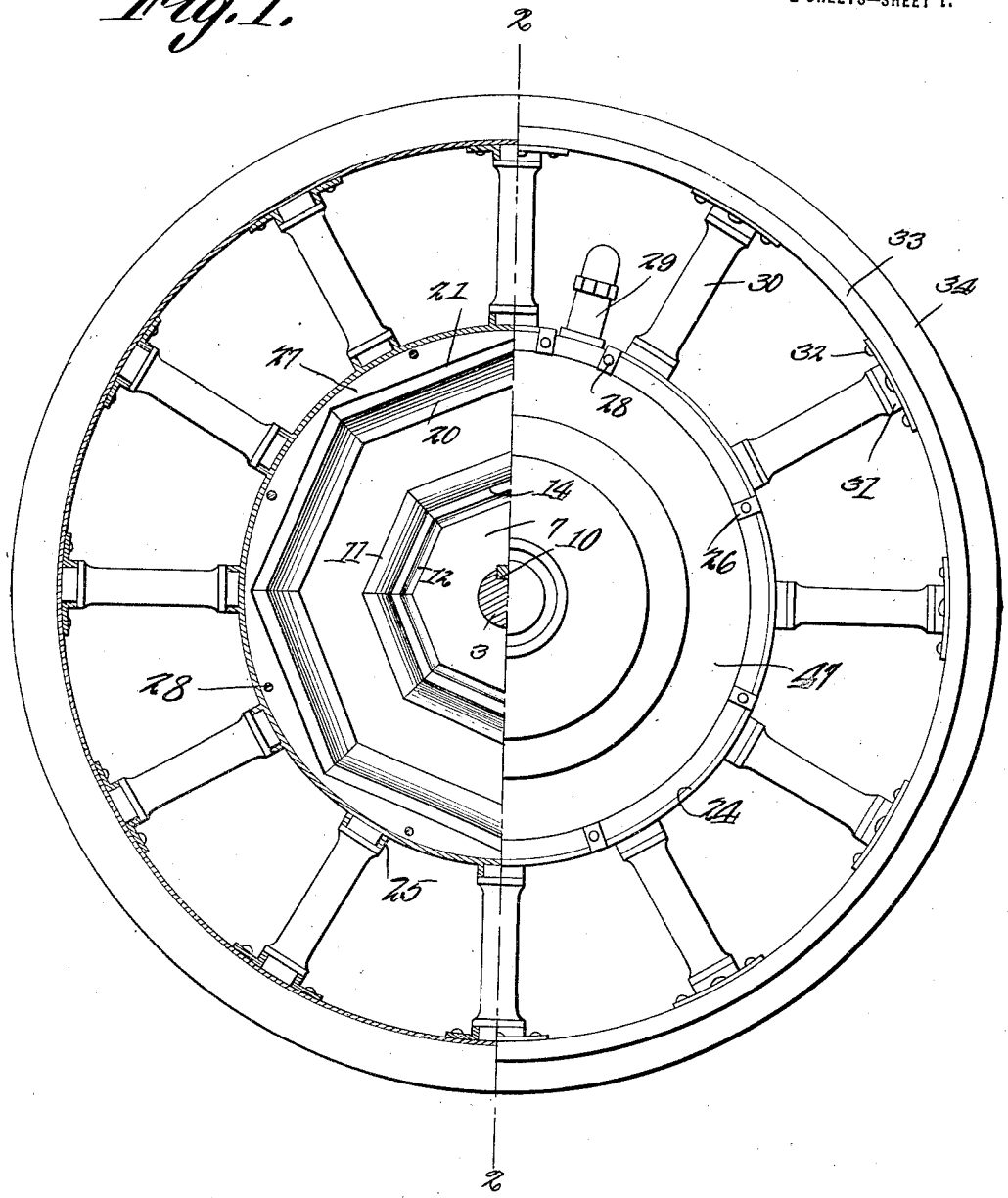

UNITED STATES PATENT OFFICE.

SALVADOR DOMINGUEZ, OF MEXICO, MEXICO.

AUTOMOBILE-WHEEL.

1,383,085.  Specification of Letters Patent.  Patented June 28, 1921.

Application filed June 14, 1917, Serial No. 174,735. Renewed May 2, 1921. Serial No. 466,215.

*To all whom it may concern:*

Be it known that I, SALVADOR DOMINGUEZ, a citizen of Mexico, residing at Mexico, D. F., Mexico, have invented a new and useful Automobile-Wheel, of which the following is a specification.

The device forming the subject matter of this application is a resilient wheel, and one object of the invention is to provide a device of this type in which the cushion is so located and housed within the hub that the cushion will not be subject to puncture and rapid deterioration.

Another object of the invention is to provide novel means for holding the cushion in place in the interior of the wheel.

It is within the province of the disclosure to provide a wheel of this kind which may be taken down and set up readily, notwithstanding the fact that certain of the hub parts of the wheel are interlocked with the cushion.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings:—

Figure 1 shows in side elevation, a wheel constructed in accordance with the present invention, portions of the wheel being broken away, so that certain interior parts of the wheel appear;

Fig. 2 is a section taken on the line 2—2 of Fig. 1;

Fig. 3 is a fragmental perspective showing a portion of one of the side plates of the wheel;

Fig. 4 is a fragmental perspective showing a portion of the outer hub of the wheel;

Fig. 5 is a fragmental perspective showing a portion of one of the side plates;

Fig. 6 is a fragmental perspective showing a portion of a modified cushion which may be substituted for the pneumatic cushion of Fig. 2.

The numeral 1 denotes an axle carrying an abutment plate 2 and including a tapered spindle 3 having a reduced extension 4 terminating in a tip 5. The extension 4 and the tip 5 are threaded in opposite directions.

The invention comprises an inner hub including collars 6 mounted on the spindle 3 and abutting at their inner ends adjacent the median plane of the wheel. The collars 6 have outstanding, abutting webs 7 which are enlarged to form ribs 8 having laterally prolonged, thickened flanges 9 which extend in opposite directions with respect to the median plane of the wheel. The flanges 9 are provided on their lateral edges with annular recesses 35. If the wheel is to be power driven, then the collars 6 of the inner hub are secured to the spindle 3 by means of a key 10, but if the wheel is not to be power driven then, of course, as a skilled mechanic will readily understand, the key 10 is omitted, and any suitable anti-friction means known in the art, and forming no part of the present application, may be interposed between the collars 6 and the spindle 3. The tread faces of the flanges 9 of the inner hub are supplied with coöperating, annular grooves defining a concaved seat 11, the flanges 9 being cut away on their adjacent faces to form a laterally enlarged recess 12 and to form a reduced slot 14 connecting the seat 11 with the recess 12.

The numeral 15 denotes a cushion which may be an inflatable, annular member, within which is located an inner tube 53. The tread portion of the cushion 15 is supplied with an annular, outstanding rib 16. The inner edges of the cushion 15 are supplied with lips 17 having laterally extended beads 18. The cushion 15 fits into the seat 11 of the inner hub, the lips 17, being pressed together, are received in the slot 14, and the beads 18 are received in the recess 12.

The invention comprises an outer hub made up of a pair of plates 19, the tread portions of which carry ribs 27 abutting against each other adjacent the median plane of the wheel. In these plates 19 is formed an annular, concaved seat 20. The ribs 27 are provided recesses defining a groove 21. The plates 19 are provided with laterally extended flanges 22 having projections 23, which extend outwardly, parallel to the median plane of the wheel. The rib 16 of the cushion 15 is received in the groove 21, and the cushion fits in the seat 20. At this point it may be noted, Fig. 1 being observed, that the inner hub and the outer hub, above defined, are of polygonal internal contour, circumferentially of the wheel, the cushion 15 being shaped accordingly, and the construction being such that the outer hub will not creep circumferentially on the cushion, the cushion, likewise, being restrained from creeping circumferentially on the inner hub.

The ribs 27 of the outer hub are circumscribed by a spoke band 24 carrying sockets 25 which may be made as desired. The band 24 has inwardly projecting ears 26 overlying the lateral faces of the ribs 27 on the outer hub, and attached thereto by securing elements 28, these securing elements passing through the ribs 27, and serving to hold the two plates of the outer hub together, and serving, as well, to hold the band 24 and its sockets 25 on the outer hub. The cushion 15 may be inflated by means of a nipple or inflating tube 29 assembled within the spoke band 24.

The inner ends of spokes 30 are received in the sockets 25, the outer ends of the spokes being received in sockets 31 held by securing elements 32 on a rim 33 carrying a tire 34 of any desired kind.

The spindle 3 of the axle 1 is surrounded closely by a pair of inner side plates 36. The side plates 36 are supplied with seats 37 in which balls 38 are journaled. The invention comprises a pair of intermediate side plates 39 in slidable contact with the balls 38. The intermediate side plates 39 have openings 40 which are large enough so that the intermediate side plates can reciprocate vertically with respect to the spindle 3. The intermediate side plates 39 extend outwardly beyond the flanges 9 of the inner hub, in a direction parallel to the median plane of the wheel, but the peripheries of the inner side plates 36 are received in the recesses 35 of the flanges 9 of the inner hub, the inner side plates 36 abutting against the ends of the hub collars 6. The peripheries of the intermediate side plates 39 are supplied with flanges 41 which project toward the median plane of the wheel and overhang the flanges 22 of the outer hub plates 19. The flanges 41 are provided with recesses 42 receiving the projections 23 of the outer hub plates 19. The construction, therefore, is such that the outer hub plates 19 are connected with the intermediate side plates 39 for simultaneous rotation. One of the intermediate side plates 39 is supplied with a brake flange 43. When braking pressure is applied to the flange 43, the restraining effort of the braking mechanism is transmitted into the plates 19 of the outer hub, directly, and independently of the cushion 15, because the parts 19 and 39 are interengaged by means of projections 23 and recesses 42.

The invention comprises a pair of outer side plates 44. One of these side plates 44 coacts with the abutment plate 2. The side plates 44 have seats 45 in which balls 46 are journaled. The intermediate side plates 39 reciprocate vertically in contact with the balls 46.

A retaining disk 47 is threaded onto the extension 4 of the spindle 3 and engages one of the outer side plates 44. The retaining disk 47 may be turned up to take up wear in the internal mechanism of the wheel, and in order that the disk 47 may be rotated readily, the same is provided with openings 49 adapted to receive a spanner. The retaining disk 47 has a reduced, threaded neck 48. A nut 50 is threaded on the tip 5 of the extension 4 and, engaging the end of the neck 48, holds the retaining disk 47 in place. Because the nut 50 and the neck 48 of the retaining disk 47 are threaded in opposite directions, respectively, onto the tip 5 and onto the extension 4, an accidental detachment of the disk 47 will be extremely unlikely. A cap 51 is threaded onto the neck 48. This cap 51 gives a finished appearance to the wheel and houses the nut 50 and the tip 5. The cap 51 is provided with openings 52, so that the cap can be rotated by means of a spanner.

In case the cushion 15, which is inflatable, becomes damaged, then the cushion 15 may be replaced by a solid, resilient cushion 54 shown in Fig. 6, and in this connection, it is to be observed that the constituent plates 19 of the outer hub, and the flanges 9 of the inner hub are provided with flat parallel faces 55 adapted to coöperate with the corresponding faces 56 of the cushion 54.

The operation of the structure is simple and need not be described at great length, it being understood that, under a load, the tire 34, the rim 33, the spokes 30, the outer hub 19 and the intermediate side plates 39 reciprocate vertically, as one piece, such a vertical recpirocation being possible, because the intermediate plates have the large openings 40 in which the spindle 3 of the axle is received. During this operation, the cushion 15, or the cushion 54, exercises its obvious function.

Since the cushion 15 has the rib 16 which is received in the groove 20 of the outer hub, and since the cushion is provided with the lips 17 and the beads 18, received, respectively, in the slot 14 and in the recess 12 of the inner hub, the cushion will be held securely in place. It is to be observed, however, that the constituent members of the inner hub may be separated readily to permit the insertion of a new cushion.

For convenience in claiming the invention, the spokes 30, the rim 33 and the tire 34 may be described as a tread.

Having thus described the invention, what is claimed, is:

As an article of manufacture, for use in the making of a cushion wheel, an annular plate provided with an outwardly and laterally projecting hub-forming collar, and having a rib provided with a flange, the rib and the flange projecting outwardly and laterally parallel to the collar, the flange having an external recess one wall of which is disposed in a common plane with the end face of the collar, there being an annular transversely concaved seat in the periphery of the flange, and there being an outwardly and laterally extended groove in the inner surface of the rib, the flange being cut away, between the seat and the groove to form a surface set outwardly and laterally from the inner surface of the plate.

In testimony that I claim the foregoing as my own, I have hereto affixed my signature in the presence of two witnesses.

SALVADOR DOMINGUEZ.

Witnesses:
  HANNA V. McCANN,
  CAPT. V. KELLY, Jr.